United States Patent
Thubert et al.

(10) Patent No.: US 12,089,089 B2
(45) Date of Patent: *Sep. 10, 2024

(54) SEMI-DISTANT TIME-SLICED ANTENNAS IN AN ASSOCIATIONLESS OVERHEAD MESH OF ACCESS POINTS

(71) Applicant: Cisco Technology, Inc., San Jose, CA (US)

(72) Inventors: Pascal Thubert, Roquefort les Pins (FR); Domenico Ficara, Essertines-sur-Yverdon (CH); Patrick Wetterwald, Mouans Sartoux (FR); Alessandro Erta, Licciana Nardi (IT); Amine Choukir, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/581,188

(22) Filed: Jan. 21, 2022

(65) Prior Publication Data

US 2023/0239739 A1    Jul. 27, 2023

(51) Int. Cl.
*H04B 10/00* (2013.01)
*H04B 10/114* (2013.01)
(Continued)

(52) U.S. Cl.
CPC ........ *H04W 28/16* (2013.01); *H04B 10/1149* (2013.01); *H04W 16/26* (2013.01); *H04W 16/28* (2013.01); *H04W 84/18* (2013.01)

(58) Field of Classification Search
CPC .............. H04B 10/112; H04B 10/1123; H04B 10/1125; H04B 10/1127; H04B 10/1129;
(Continued)

(56) References Cited

U.S. PATENT DOCUMENTS

| 9,769,708 B2 | 9/2017 | Bisti et al. |
| 10,735,924 B2 | 8/2020 | Thubert et al. |

(Continued)

FOREIGN PATENT DOCUMENTS

JP    2019080250 A    5/2019

OTHER PUBLICATIONS

Guizzo, Erico, "Kiva Systems: Three Engineers, Hundreds of Robots, One Warehouse", online: https://spectrum.ieee.org/three-engineers-hundreds-of-robots-one-warehouse#toggle-gdpr, Jul. 2, 2008, 9 pages, IEEE Spectrum.

(Continued)

*Primary Examiner* — Hanh Phan
(74) *Attorney, Agent, or Firm* — BEHMKE INNOVATION GROUP LLC; James M. Behmke; Keith O. Mitchell

(57) ABSTRACT

In one embodiment, a controller identifies access points forming an overhead mesh of access points in an area, each access point comprising one or more directional transmitters each configured to transmit a beam cone in a substantially downward direction towards a floor of the area. The controller assigns the access points to access point groups. The controller generates communication schedules for the access points such that each access point in an access point group is on a common channel and only one of neighboring directional transmitters of access points in that group is able to transmit at any given time. The controller sends the communication schedules to the access points forming the overhead mesh of access points in the area.

20 Claims, 8 Drawing Sheets

(51) Int. Cl.
*H04W 16/26* (2009.01)
*H04W 16/28* (2009.01)
*H04W 28/16* (2009.01)
*H04W 84/18* (2009.01)

(58) Field of Classification Search
CPC .............. H04B 10/114; H04B 10/1143; H04B 10/1149; H04B 10/116; H04W 72/0446; H04W 4/02; H04W 24/04; H04W 28/16; H04W 16/26; H04W 16/28
USPC ....... 398/118, 119, 120, 127, 128, 129, 130, 398/131, 135, 136, 158, 159, 172, 115, 398/66, 67, 68, 69, 70, 71, 72, 98, 99, 398/100; 370/328, 329, 392, 389, 465, 370/468
See application file for complete search history.

(56) References Cited

U.S. PATENT DOCUMENTS

| 2015/0341807 | A1  | 11/2015 | Jeffery et al. |           |
|--------------|-----|---------|----------------|-----------|
| 2016/0157225 | A1* | 6/2016  | Joshi          | H04W 4/02 |
|              |     |         |                | 370/329   |
| 2018/0115918 | A1* | 4/2018  | Arjun          | H04L 41/082 |
| 2020/0015043 | A1  | 1/2020  | Patil et al.   |           |
| 2021/0135354 | A1  | 5/2021  | Sanford et al. |           |
| 2023/0090182 | A1* | 3/2023  | Salas Moreno ... | H04W 36/0085 |
|              |     |         |                | 370/331   |
| 2023/0239352 | A1* | 7/2023  | Thubert        | H04W 84/12 |
|              |     |         |                | 370/254   |

OTHER PUBLICATIONS

"Making the Most of Multi-User MIMO", online: https://www.commscope.com/blog/2015/making-the-most-of-multi-user-mimo/, May 1, 2015, accessed Aug. 26, 2021, 4 pages, CommScope.
"Li-Fi", online: https://en.wikipedia.org/wiki/Li-Fi, Dec. 24, 2021, accessed Jan. 3, 2022, 8 pages, Wikimedia Foundation, Inc.
"LoRa", online: https://en.wikipedia.org/wiki/LoRa, Dec. 6, 2021, accessed Jan. 3, 2022, 4 pages, Wikimedia Foundation, Inc.
"Time Slotted Channel Hopping", online: https://en.wikipedia.org/wiki/Time_Slotted_Channel_Hopping, 3 pages, Dec. 17, 2021, accessed Jan. 3, 2022, Wikimedia Foundation, Inc.
Dolnak, et al., "Using IPv6 protocol in V2X networks based on IEEE 802.11-OCB mode of operation", Proc. of the 2nd International Conference on Electrical, Communication and Computer Engineering (ICECCE), 4 pp. Jun. 12-13, 2020, Istanbul, Turkey.
"5G Terminology: The gNB", online: https://www.5g-networks.net/5g-technology/5g-terminology-the-gnb/, May 24, 2019, 2 pages.
"IEEE 802.11p", online: https://en.wikipedia.org/wiki/IEEE_802.11p, Nov. 26, 2021, 3 pages, Wikimedia Foundation, Inc.
"Directional Antenna", online: https://en.wikipedia.org/wiki/Directional_antenna, Nov. 1, 2021, accessed Jan. 4, 2022, 4 pages, Wikimedia Foundation, Inc.

* cited by examiner

SEMI-DISTANT TIME-SLICED ANTENNAS IN AN ASSOCIATIONLESS OVERHEAD MESH OF ACCESS POINTS

TECHNICAL FIELD

The present disclosure relates generally to computer networks, and, more particularly, to semi-distant, time-sliced antennas in an associationless overhead mesh of access points.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. In other words, the IoT has expanded to include many operational technology (OT) networks, as well.

Traditionally, many OT networks have relied on wired networking solutions. This is primarily due to the potential for error, should a wireless solution be adopted. For instance, consider the case of a factory. Any errors in the wireless communications in such a setting could disrupt the manufacturing process (e.g., a by failing to provide a control command to an actuator, by failing to provide sensor data to a controller, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
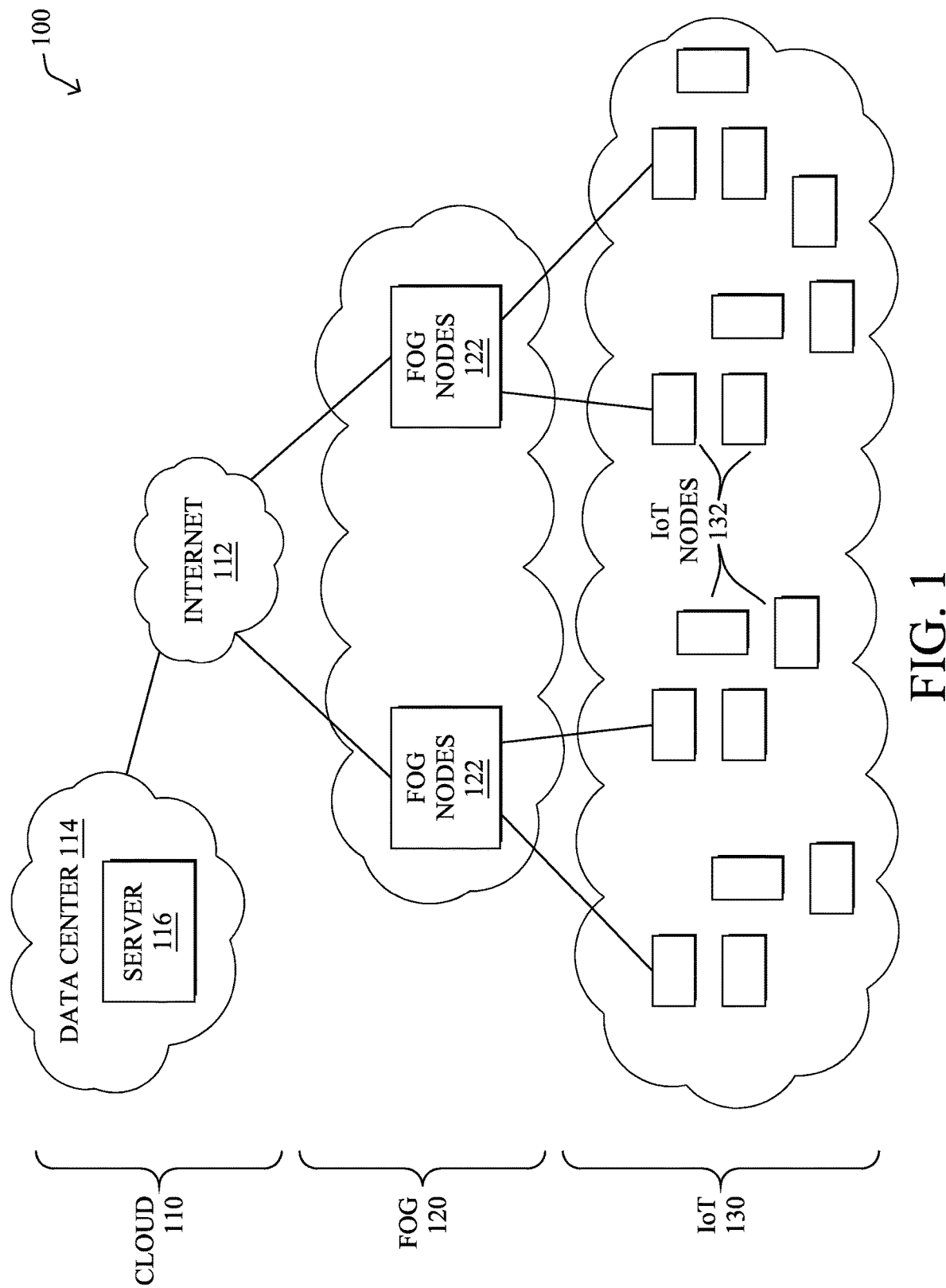
FIG. 1 illustrate an example network.

According to one or more embodiments of the disclosure, a controller identifies access points forming an overhead mesh of access points in an area, each access point comprising one or more directional transmitters each configured to transmit a beam cone in a substantially downward direction towards a floor of the area. The controller assigns the access points to access point groups. The controller generates communication schedules for the access points such that each access point in an access point group is on a common channel and only one of neighboring directional transmitters of access points in that group is able to transmit at any given time. The controller sends the communication schedules to the access points forming the overhead mesh of access points in the area.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:
1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
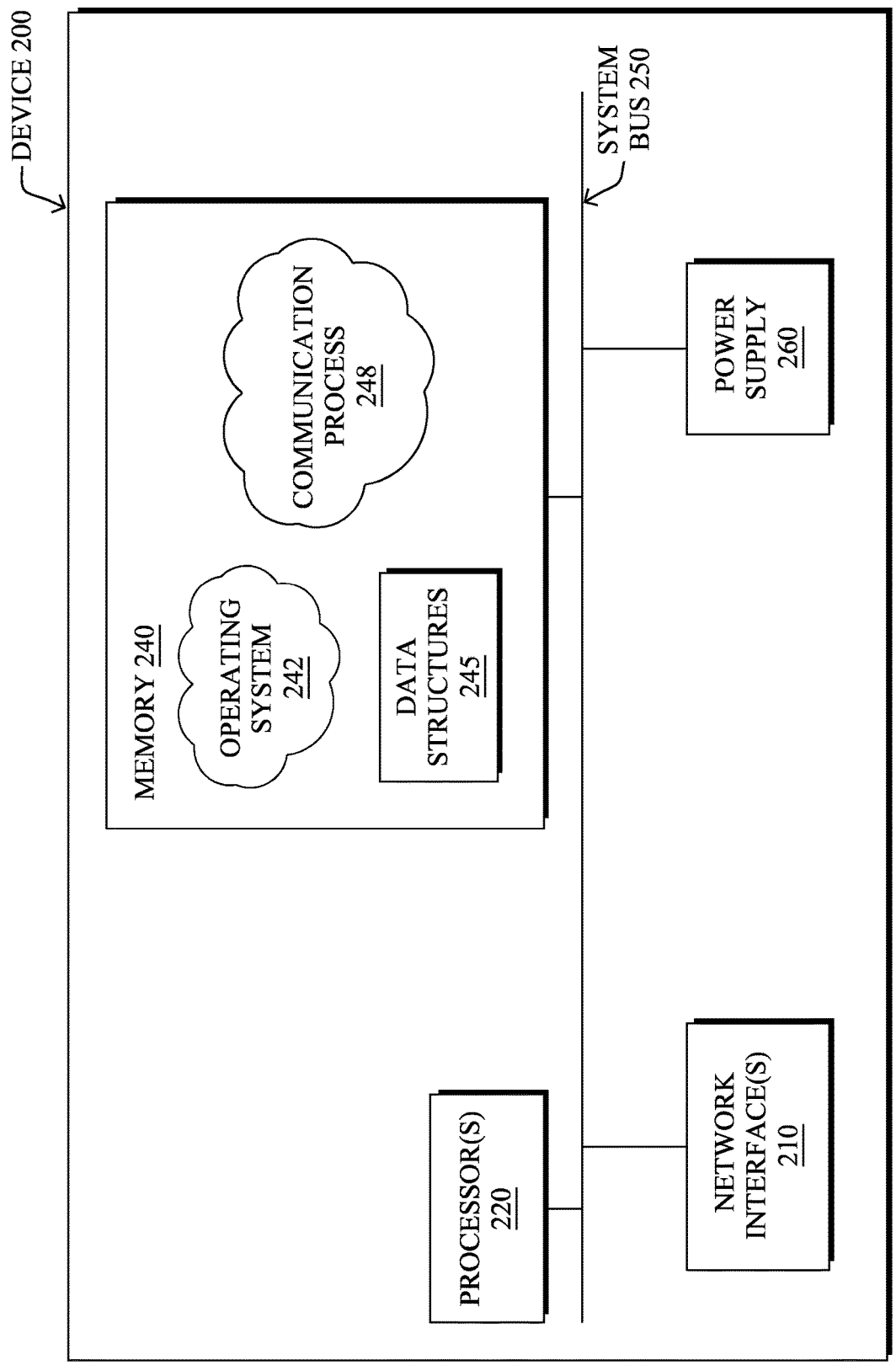
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below (e.g., a client device, an access point, a network controller, etc.). The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
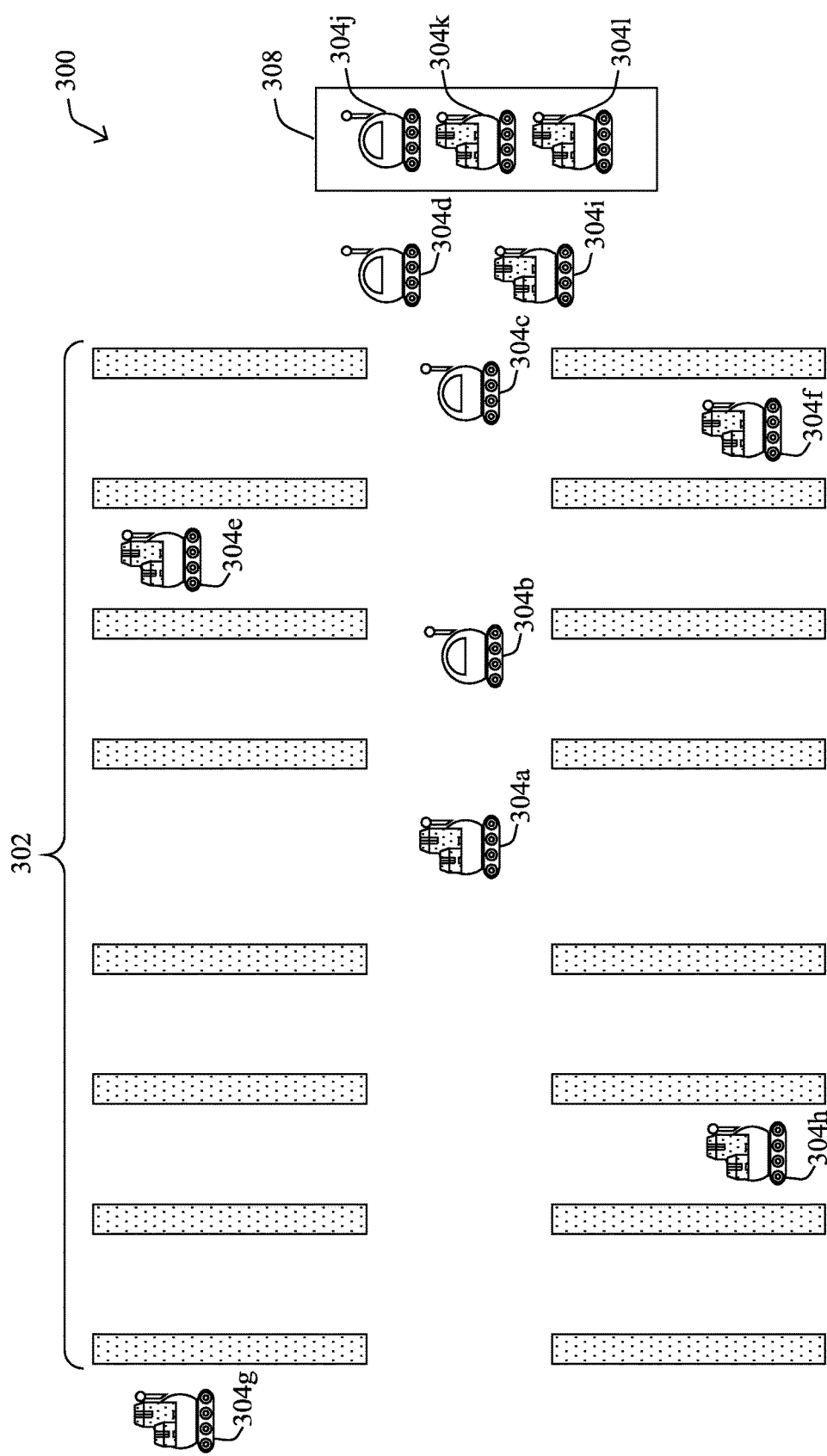
FIG. 3 illustrates an example industrial wireless network deployed in a warehouse.

FIG. 3 illustrates an example warehouse 300. As shown, assume that a plurality of inventory racks 302 are distributed throughout warehouse 300 for purposes of storing items. As would be appreciated, inventory racks 302 are optional and other forms of storage systems may be deployed throughout warehouse 300, in other cases. For instance, warehouse 300 may also include containers, holding pens, or the like, in which various items may be stored.

To aid in the storage and/or retrieval of the items in the warehouse, any number of mobile robots 304 may be deployed, such as mobile robots 302a-304l shown. In general, each mobile robot 304 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 304 may also include mechanisms to automatically load and/or unload items, such as forklifts, mechanical claws, or the like. In other embodiments, mobile robots 304 may require the assistance of human workers to load and unload items to and from them, such as at a pack-out area 308.

In some instances, mobile robots 304 may be partially or fully autonomous, allowing them to complete their tasks, independently. For instance, a particular mobile robot 304 may be sent a task list that indicates the set of items that the robot is to retrieve from within warehouse 300, navigation information if so needed, or any other information that may be required for the performance of its retrieval functions.

As noted above, operational technology (OT) networks have traditionally favored wired networking techniques, due to their perceived reliability over wireless approaches. Indeed, if a wireless communication is lost or delayed in an industrial setting, it could disrupt the manufacturing (or other) process that is being controlled. However, as the IoT expands into these settings, the use of wireless networking often becomes unavoidable, such as in the case of mobile devices (e.g., mobile robots 304 in FIG. 3). Current approaches, however, still need to contend with issues such as the speed of roaming supported by the network, shelving masking the wireless signals, and the like.

There are also some efforts to adapt Time Sensitive Networking (TSN) to both 5G and 802.11, to support wireless OT deployments. In both cases, the adaptation adds complexity over the already complex set of standards, making them even harder to understand and operate, and ultimately to have confidence in the solution. Confidence, in fact, is the core requirement in OT networking as it allows one to understand and make assumptions on its behavior. In 5G and 802.11, the adaptation builds on the existing peer-to-peer P2P relationship between a client/station (STA)/user equipment (UE) and an access point (AP)/base station (BS)/gNB, respectively. Note that the terminology varies by wireless protocol and the terms "client" and "AP" are used herein for purposes of simplicity, without limiting the techniques herein to a specific protocol. Regardless, these efforts still require the establishment of a wireless association between a client and AP, which can naturally slow down the roaming process, as well as preventing the use of multi-point to multi-point (MP2MP) radio connectivity.

Semi-Distant Time-Sliced Antennas in an Associationless Overhead Mesh of APs

The techniques introduced herein allow a client device to communicate wirelessly through the use of an overhead mesh of access points. In some aspects, the client device may do so without having to first perform a wireless association exchange with any given access point, making the techniques herein 'associationless.' In other aspects, transmitters of the access points may transmit using directional beam cones aimed substantially downward towards the floor of an area. In addition, these transmitters may be positioned and configured to transmit such that global coverage of the area is still achieved without any two transmitters on the same channel do not interfere with one another at the same time.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Specifically, in various embodiments, a controller identifies access points forming an overhead mesh of access points in an area, each access point comprising one or more directional transmitters each configured to transmit a beam cone in a substantially downward direction towards a floor of the area. The controller assigns the access points to access point groups. The controller generates communication schedules for the access points such that each access point in an access point group is on a common channel and only one of neighboring directional transmitters of access points in that group is able to transmit at any given time. The controller sends the communication schedules to the access points forming the overhead mesh of access points in the area.

Figure 4B:
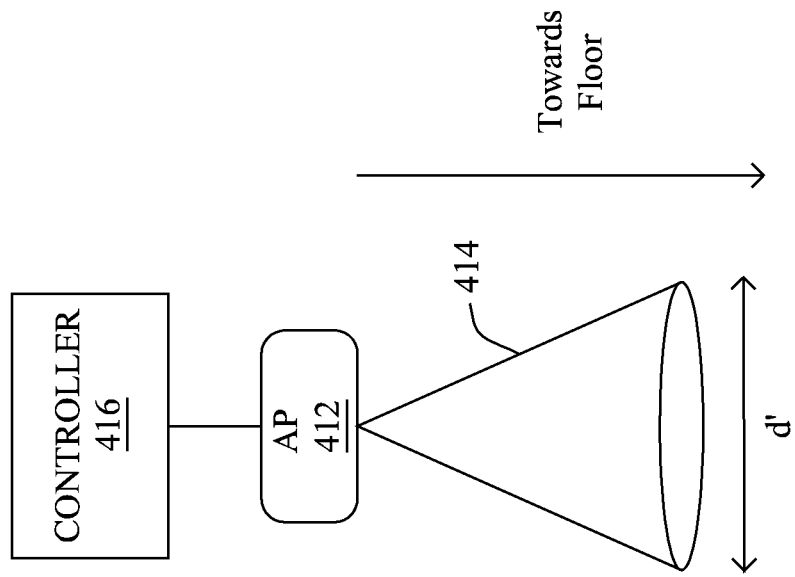
FIGS. 4A-4B illustrate example radiation patterns by nodes of a wireless network.
Figure 4A:
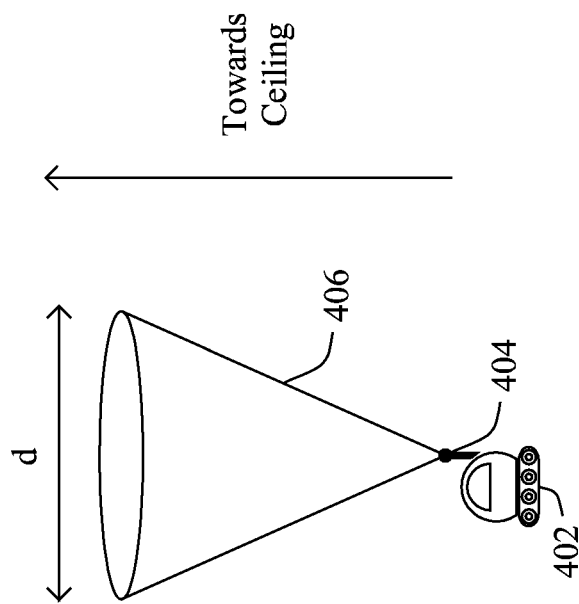

Operationally, FIGS. 4A-4B illustrate example radiation patterns by nodes of a wireless network, according to various embodiments. As shown in FIG. 4A, a client device 402, such as a mobile robot 304 in FIG. 3, a stationary device, or any other wireless client requiring connectivity, may include a transceiver or transceiver that comprises a directional antenna 404 that is pointed substantially upward relative to client device 402. For instance, in the case of a warehouse, factory, or the like, directional antenna 404 may be pointed substantially towards the ceiling of the building.

In general, a defining characteristic of directional antenna 404 is that its radiation pattern will exhibit significantly higher gain in the upward direction than in its lateral directions. As would be appreciated, this can help to prevent client device 402 from interfering with any other nearby client devices, as its transmissions are directed substantially upward. Example directional antennas that may be suitable for use as directional antenna 404 may include, but are not limited to, Yagi antennas, log-periodic antennas, corner reflector antennas, phased array antennas, and the like. For instance, in the case of directional antenna 404 including multiple radiating elements, client device 402 may use beamforming to direct its transmissions substantially upward (e.g., near, or precisely, perpendicular to the floor of the area).

As a result of the operation of directional antenna 404, any wireless transmission from client device 402 will take the form of a beam cone 406 that exhibits a diameter d when it comes in contact with the overhead mesh of access points above client device 402. Note that even in the case of extremely tight beam patterns, divergence effects will cause the transmissions to exhibit an increased diameter as the distance increases, thereby taking on a cone-like pattern.

FIG. 4B illustrates an example access point of the overhead mesh of access points introduced herein, according to various embodiments. As shown, access point (AP) 412 may use a similar approach as that of client device 402 to direct its transmissions, but in the opposite direction towards the floor of the area. Thus, AP 412 may include a directional antenna that sends communications from AP 412 that may take the form of a beam cone 414 having a diameter d' at the floor of the area or at a predefined height relative to the floor.

To prevent energy leafage between cones (e.g., between the beam cones of different APs, different client devices, etc.), the energy differential may be sufficient to eliminate the parasite signal, such as by the receiving device. This is true also for a signal that will rebound multiple times and be attenuated by distance and diffusion/spreading on a reflective surface that is not flat. In other instances, the sending device (e.g., client device 402, AP 412, etc.) may also be equipped with shielding that can absorb whatever energy is not perfectly radiated in the cone, in some embodiments.

In various embodiments, AP 412 may be controlled by a controller 416 that oversees the operation of the entire set of APs in the overhead mesh or a portion thereof. In some embodiments, controller 416 may compute and provide a communication schedule to AP 412. Such a communication schedule may control when AP 412 is to transmit data towards the floor of the area and/or listen for any messages transmitted upward towards the mesh of overhead APs. In a further instance, the communication schedule sent to AP 412 by controller 416 may also dictate the wavelengths/channels on which AP 412 is to communicate.

During deployment, overhead APs, such as AP 412, may be placed along the ceiling or other overhead structure, to ensure that there is always at least one AP in the beam cone of a client device. Preferably, there will always be at least two APs within the beam cone of a client device, thereby providing redundancy in case a transmission from the client device is not received by one of them.

In some embodiments, a client device, such as client device 402, may communicate wirelessly with an AP of the overhead mesh, such as AP 412, without having to first perform an association exchange with it. As would be appreciated, such exchanges typically entail a discovery phase, an authentication phase, and a final association phase. During the discovery phase, the client device and the AP first discover one another, wirelessly. This is often achieved by the AP sending out a beacon signal, the client device sending a probe request to the AP, and the AP returning a probe response. Such a response allows the client device to determine which AP is the 'best' in terms of signal strength/received signal strength indicator (RSSI). During the authentication phase, the client device may then send an authentication request to the AP that often includes cryptographic information that allows the network to authenticate the device (e.g., a password to connect to a Wi-Fi network). Finally, once authenticated, the client device may send an association request to the AP to which the AP responds, thereby forming an association between the client device and the specific AP.

Rather than requiring an association exchange with a given AP in the traditional manner, the techniques herein propose that a client device simply register with the controller for the overhead mesh of APs. For instance, client device 402 may register with controller 416. In various embodiments, this registration may also entail client device 402 and controller 416 coordinating the movements of client device 402 over time in the area, either on a pull or push basis. In a fully or semi-autonomous mode of operation of client device 402, for instance, the registration with controller 416 may entail client device 402 or another device in communication therewith providing the movement schedules of client device 402 to controller 416. Alternatively, controller 416 itself may dictate the movement schedule of client device 402 as part of the registration process (e.g., to ensure that client device 402 is not near any other client device when transmitting, to avoid interference). In either case, controller 416 may then generate and provide a communication schedule to client device 402 that may be based in part on the movements of client device 402 over time, in some embodiments.

Since the communications of the client devices and the APs in the overhead mesh are both scheduled by controller 416, there is no need for any given client device to first perform an association exchange with any given AP in the overhead mesh. Instead, any AP in the mesh that receives a transmission from the client device may simply relay the received message onward, such as to controller 416. In the case of multiple APs receiving the same transmission from a client device, controller 416 can then perform deduplication of the redundant messages (e.g., before sending the message on towards its destination, before processing the message locally, etc.).

For instance, client device 402 may simply transmit a message without specifying a source and destination media access control (MAC) address, such as by using a broadcast mode of transmission that is received by one or more of the overhead APs in the mesh. Based on the location of the AP(s) that receive a transmission and/or the timing of the transmission, controller 416 can easily identify the sender of the transmission. In other words, the receiving AP(s) in the mesh essentially function as translational relays that do not have to process MAC addresses or any cryptography (e.g., as part of an authentication exchange).

Figure 5:
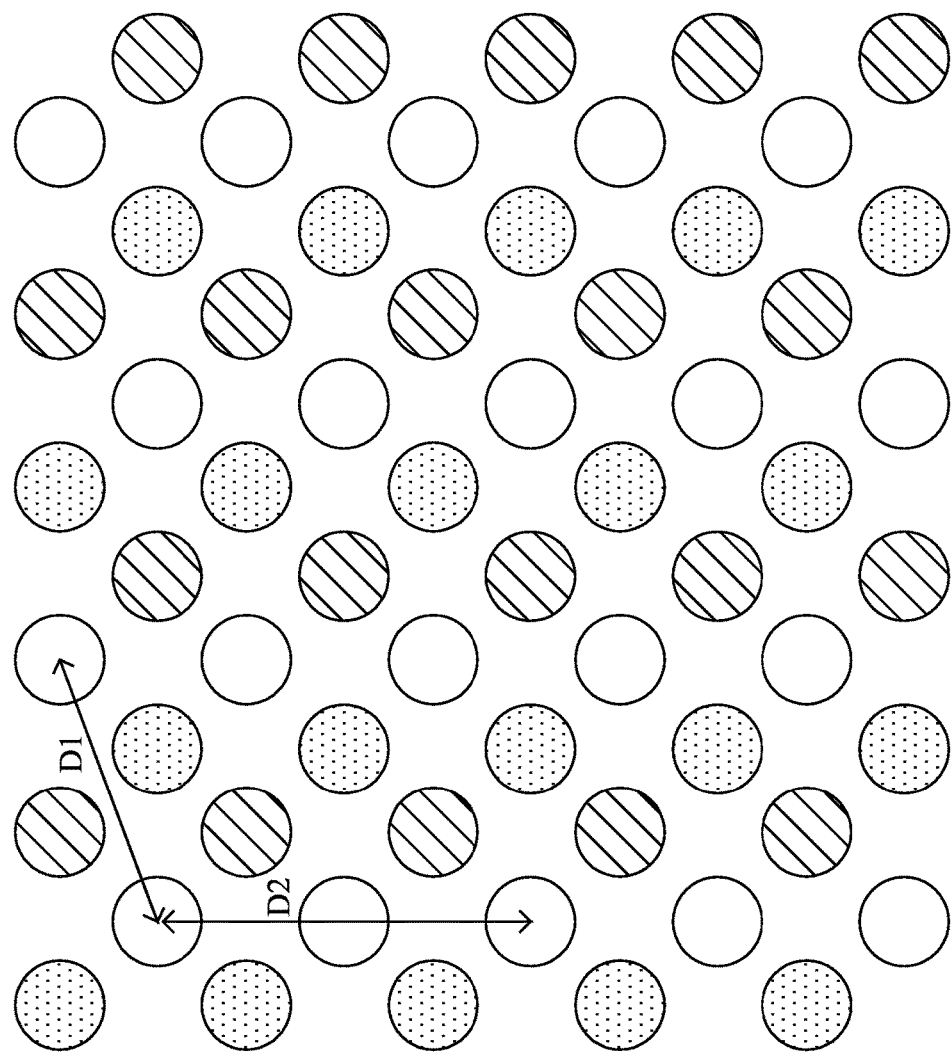
FIG. 5 illustrates an example mesh of overhead-mounted access points.
Figure 5:
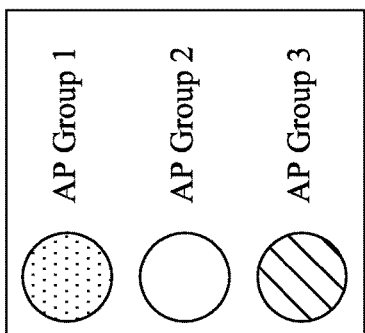

FIG. 5 illustrates an example mesh 500 of overhead-mounted access points (e.g., APs 412), according to various embodiments. In some embodiments, the controller for the mesh (e.g., controller 416) may subdivide the APs in the mesh into different groups, each of which is assigned to a different channel or channel hopping schedule. For instance, mesh 500 may be divided into three different subsets/AP groups, each of which operates on a different channel at any given time. Of course, any number of different AP groups and wireless channels could be used, as desired.

In a further embodiment, the different APs, or different radiators/antennas of a certain AP, in any given group may also be assigned to different time slices in their communication schedules, as well. For instance, assume that four of the circles shown in FIG. 5 belonging to AP group 1 are all controlled by a singular AP having four directional antennas. In such a case, the communication schedule may assign each antenna to a different time slice and the AP may rotate its transmissions across its four antennas, only transmitting on one of them at any given time.

To ensure that any given client device is able to reach at least one of its corresponding APs in mesh 500 during any transmission, the APs in any given group may be physically spaced such that at least one of them will always fall within the diameter of the beam cone of the client device (e.g., diameter d shown in FIG. 4A). In addition, since the wireless network is associationless, this means that a roaming operation does not need to be performed when the client device moves out of the range of one AP and into the range of another AP, as the APs are all functionally equivalent relays for the client device.

Further considerations for the physical layout of 500 may also take into account the communication schedules and channel groupings of the APs. For instance, let D1 represent the distance between APs in the same subset/group that belong to different time slices, meaning that they do not transmit at the same time on the same channel. In addition, let D2 represent the distance between APs of the same subset/group that belong to the same time slice, meaning that they do transmit on the same channel at the same time. In various embodiments, mesh 500 may be deployed such that the following condition is satisfied:

$$D1 < d < D2$$

where d is the diameter of the beam cone of a client device at the height of the ceiling, mesh 500, etc. and/or the diameter of the beam cone of an AP at the floor of the area, at the height of any receiver of a client device, etc. In doing so, this ensures that the client device is able to communicate with at least one AP in mesh 500 on its channel and during its assigned time slice, but not any interfering ones.

The physical sizes of the client devices and their scheduled movements may also be such that the number of client devices in any given downward cone from an AP is limited (e.g., only one client device is physically able to fit within the diameter d' of the beam cone of a given AP). In some embodiments, the communication schedules of the APs and client devices may be such that the client devices transmit at the same time and the APs transmit together, as well. The result is that the energy leaking from any client device will not affect any other nearby client device, since they are not receiving at that time. Note that, in some instances, there may be some reflection of a signal by either the ground or ceiling. However, the client device may act as a shield against such reflections in the downward case. In addition, any reflections will be further attenuated by distance, coating, irregularities on the surface that make the inference dependent on the location, or the like. Movement of a client device can also help to eliminate this issue. Regardless, any unwanted signals due to reflection can be eliminated (e.g., by the receiving device) by filtering the received transmissions by their power level diversity.

While the above techniques are described primarily with respect to radio frequency (RF) transmissions, a variation of the techniques herein would be to leverage Li-Fi for at least a portion of the wireless transmissions. As would be appreciated, Li-Fi is another wireless communication approach that uses visible light, ultraviolet, and/or infrared light to convey messages, wirelessly. This option may be preferable to using RF in instances such as warehouses with tight corridors that limit the window of a client device to the overhead mesh. In addition, using Li-Fi can also avoid having to filter transmissions that result from RF echoing off metallic structures.

Thus, in some embodiments, the APs of mesh 500 may take the form of Li-Fi transmitters or transceivers that use light emitters, rather than directional RF antennas, to send data to the client devices. Similar to the RF case above, the APs may also be subdivided and assigned to groups that communicate using different wavelengths (e.g., light-based channels). In some embodiments, the client devices may also be equipped with tracking systems that identify the source of a Li-Fi transmission so that it can direct its own transmissions upward towards that AP.

In further embodiments, both Li-Fi and RF can be used in concert with one another, providing additional redundancy to ensure communication at all times. In this case, different modes of operation are then possible, in various embodiments:

Both Li-Fi and RF are used at all times.
The APs of mesh 500 use Li-Fi or RF in an alternating fashion, according to some communication schedule (e.g., similar to a chess board configuration, etc.).
The APs of mesh 500 use Li-Fi by default and resort to using RF in the case of failures, only.

In all of the above cases, the combination of RF and Li-Fi allows also for full-duplex communications between a client device and an AP. For instance, light may be used for the downlinks from an AP to a client device and radio may be used for the uplink from the client device to the AP at the same time, without interfering with one another.

As a result of the above techniques, multiple APs may receive and relay the same frame transmitted by a client device. To provide such global coverage of the area without creating interference conditions, the transmitters/antennas of the APs may be physically spread out in an interleaved pattern across APs that operate on different channels, according to a time-sliced communication scheduling mechanism. Such scheduling may cause the APs to rotate among their transmitters on the same channel (e.g., those of APs belonging to the same AP group) such that any two of them are distant enough so as to not interfere with one another at the same time. This increases the density of the antennas and allows for global coverage for each wireless channel.

Figure 6:
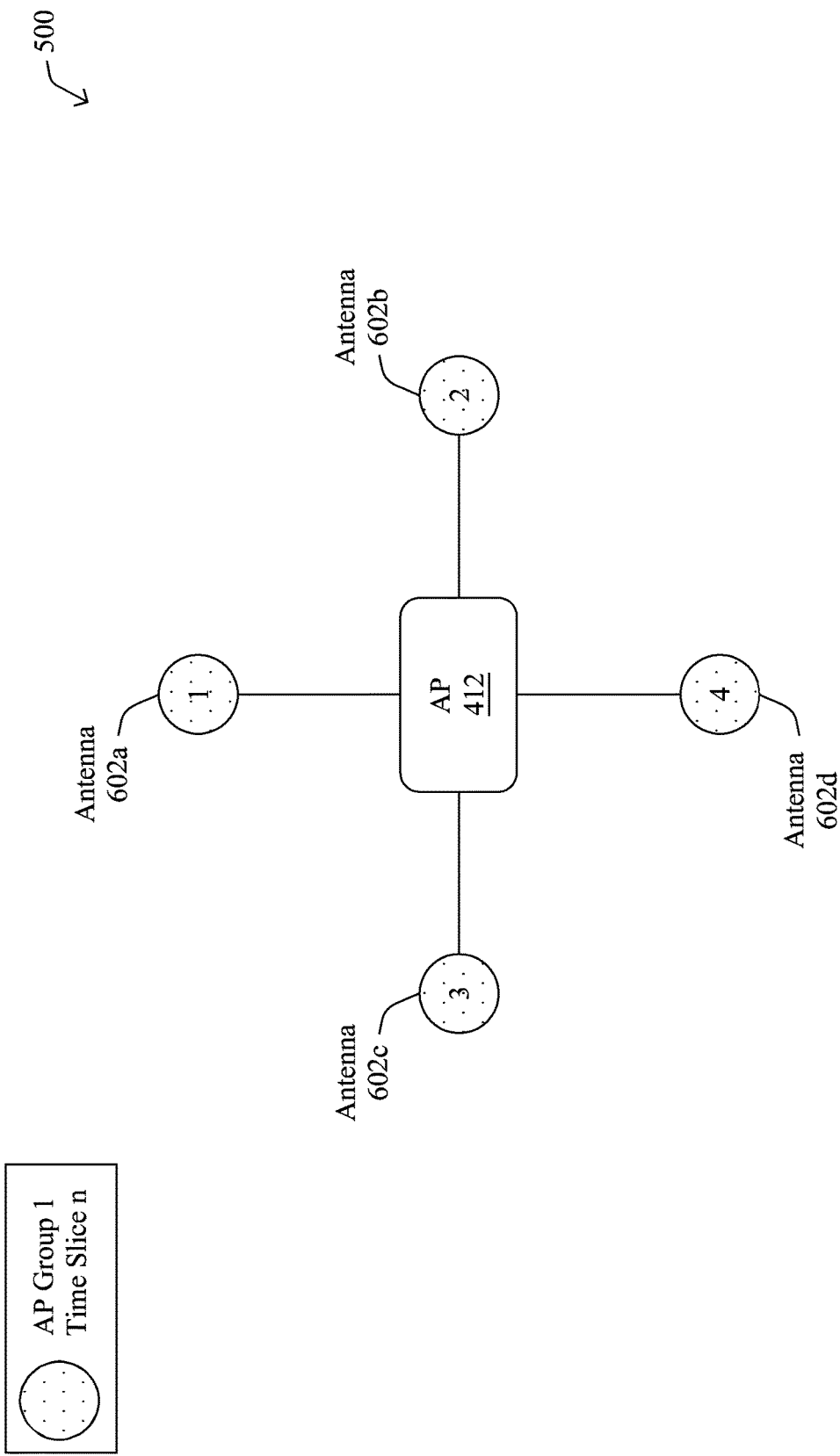
FIG. 6 illustrates an example access point having multiple antennas.

FIG. 6 illustrates an example AP 412 having multiple antennas, according to various embodiments. For instance, as shown, AP 412 may include antennas 602a-602d, each of which may transmit beam cones in a direction substantially downward from the mesh of APs towards the floor of the area. While AP 412 is shown to have antennas 602a-602d in a cross-like orientation, further embodiments provide for AP 412 to include fewer, or more, antennas in other physical layouts (e.g., a hexagon, etc.), so long as the resulting shapes can connect with one another in the mesh to form a global and homogeneous coverage of the area. In other words, the shape can be filled with any density of antennas for MIMO, MU-MIMO, or massive MU-MIMO operations.

As shown, the mesh controller may assign AP 412 to a particular AP group 1, members of which are on the same channel at any given time. According to various embodiments, the communication schedule for AP 412 may be such that only one of its antennas 602a-602d is allowed to transmit during any given time slice. For instance, the communication schedule for AP 412 may dictate that it can transmit using antennas 602a-602d in a rotating manner over time, such as by allowing antenna 602a to transmit first, followed by antenna 602b, followed by antenna 602c, followed by antenna 602d, followed by antenna 602a again, etc.

In contrast to many existing APs that use multiple antennas for multiple-input, multiple-output (MIMO) operation, the primary purpose of AP 412 having multiple antennas 602a-602d is to provide spatial diversity. In the system herein, both APs and client devices may receive at all times from any antenna. However, APs are constrained as to which of its antennas are allowed to transmit at any point in time (i.e., the antenna permitted to transmit is tied to a time slice in the communication schedule). In addition to this, APs and client devices may be scheduled to transmit at alternating times, in some embodiments. In this case, AP 412 should use its antenna that is above the client device and thus wait for the slice that corresponds to the antenna. If the AP is not aware of the movement of the client device, but its controller is, then the controller needs to time precisely when its sends the packet to the client device via an AP at the time the client device is below the active antenna of that AP.

Figure 7:
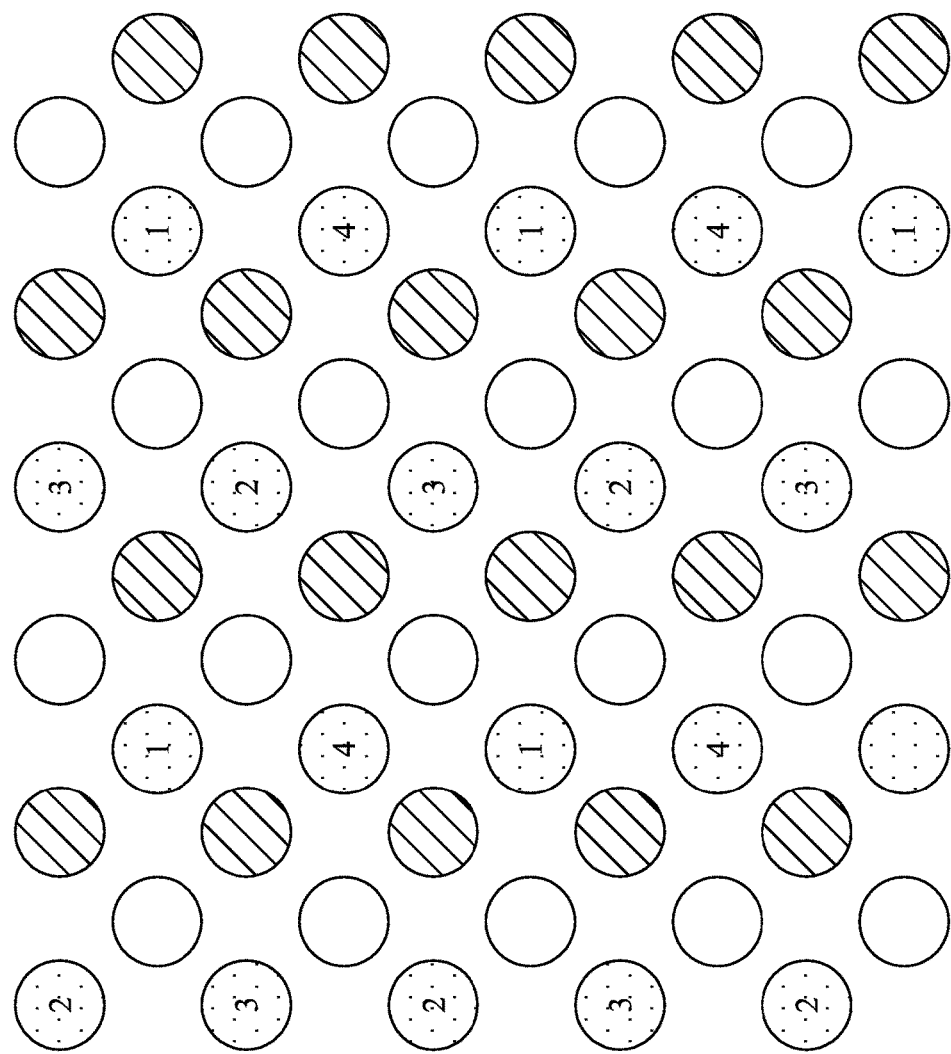
FIG. 7 illustrates an example of rotating time slots for transmitters of an access point group in the mesh of FIG. 5.

In various embodiments, each AP in the same AP group may also follow the same rotation schedule, thereby ensuring that neighboring transmitters in that group are not transmitting on the same channel and at the same time. For instance, FIG. 7 illustrates an example of rotating time slots for transmitters of an access point group in mesh 500 of FIG. 5, according to various embodiments. More specifically, FIG. 7 shows a potential rotation schedule for the transmitters of APs belonging to AP group 1.

As shown, the controller for the overhead mesh may schedule the transmissions of the APs in mesh 500 such that the D1<d<D2 condition above is always satisfied, according to various embodiments. Here, the APs may be positioned at a distance whereby APs in the same group (i.e., on the same channel) do not overlap and their transmitters are also spaced and scheduled such that neighboring transmitters are not transmitting at the same time. For instance, in the case in which the transmitters of an AP form a cross-like configuration, the right antenna of an AP in AP group 1 may be disposed close enough to that of the left antenna of another AP in that group so that there is universal coverage over the area. As would be appreciated, the communication schedules for the other AP groups (e.g., AP group 2, AP group 3, etc.) may also follow a rotating schedule of time slices, in a manner similar to those of AP group 1. This helps to ensure that there is always at least one antenna for each AP group about a client device at all times.

In various embodiments, the rotating transmit schedules for the various transmitters of an AP group may follow any number of different patterns, so long as the above constraints are still satisfied. Indeed, the scheduled rotations may be a function of the number of transmitters of an AP, their shape/layout, etc. So long as the APs in any given AP group, or across all AP groups, follow the same rotating schedule, there will still be universal coverage of the area with little or no interference, in various embodiments. Consequently, as a result of the techniques herein, mesh 500 will be scheduled in an intelligent manner by its controller using both time slicing and frequency/channel assignments, to augment the density of overhead APs in mesh 500.

By way of example, assume that each AP of mesh 500 includes four transmitters in manner similar to that shown in FIG. 6. In such a case, any or all of the following may hold true, in various embodiments:

Each AP will only transmit one quarter of the time on each of its four antennas (note that this can vary, as other embodiments provide for fewer or more antennas)

Each AP can receive on all of its antennas with full diversity

Since its antennas are physically distant from one another, an AP may still receive even when transmitting A client device below mesh 500 may simply evaluate the beacons from its overhead AP(s) and select the time slice on which to transmit.

A client device receives from only one AP, channel, and time slice, satisfying the d<D2 constraint above.

Transmissions from a client device are received by more than one AP and/or more than one antenna per AP, satisfying the D1<d constraint above.

Figure 8:
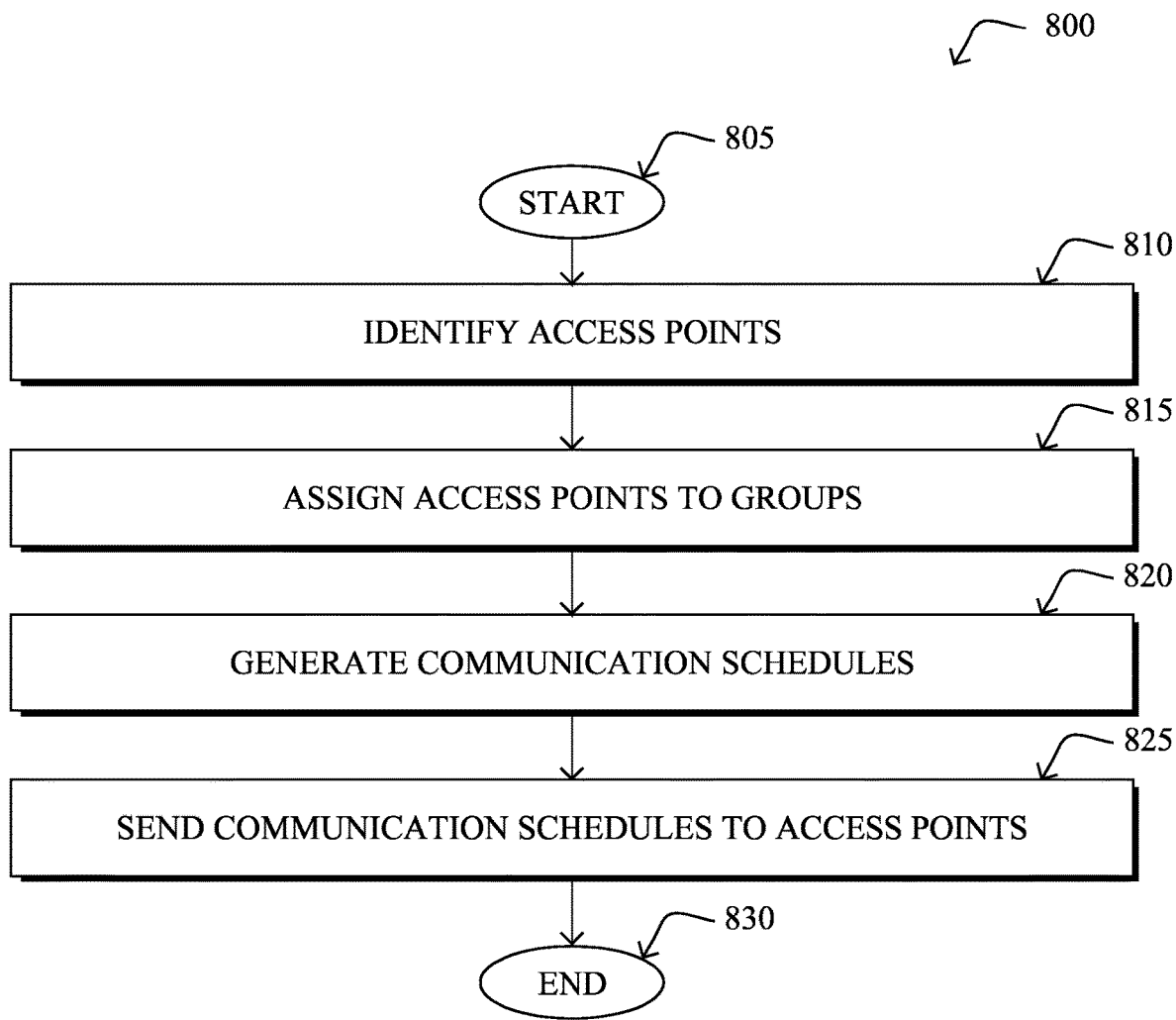
FIG. 8 illustrates an example simplified procedure for scheduling communications in an overhead mesh of access points.

FIG. 8 illustrates an example simplified procedure for scheduling communications in an overhead mesh of access points, in accordance with one or more embodiments described herein. The procedure 800 may start at step 805, and continues to step 810, where, as described in greater detail above, a controller (e.g., device 200) for an overhead mesh of access points may identify access points forming the overhead mesh in an area. Each of the access points may include one or more directional transmitters each configured to transmit a beam cone in a substantially downward direction towards a floor of the area. In one embodiment, a directional transmitter of an access point in the overhead mesh comprises a directional antenna. In another embodiment, a directional transmitter of an access point in the overhead mesh comprises a Li-Fi emitter. In various embodiments, the beam cone has a diameter that is greater than a distance between neighboring directional transmitters of one or more access points in any given access point group. In further embodiments, the beam cone has a diameter that is less than a distance between directional transmitters belonging to a same access point group that are allowed to transmit simultaneously in accordance with the communication schedules.

At step 815, as detailed above, the controller may assign the access points to access point groups. In general, each access point group may be on the same wireless channel at any given time, while those in other groups may be on different channels. In one embodiment, a particular access point in the overhead mesh comprises a plurality of directional antennas. In another embodiment, the particular access point transmits beam cones substantially downward via its directional antennas in a rotating fashion over time, in accordance with its communication schedule. In a further embodiment, the particular access point is able to receive messages simultaneously via its directional antennas, in accordance with its communication schedule.

At step 820, the controller may generate communication schedules for the access points such that each access point in an access point group is on a common channel and only one of neighboring directional transmitters of access points in that group is able to transmit at any given time, as described in greater detail above.

At step 825, as detailed above, the controller may send the communication schedules to the access points forming the overhead mesh of access points in the area. In one embodiment, a transmitter of a client device transmits a message towards the overhead mesh of access points in the area as a beam cone directed substantially upward relative to the client device. In one embodiment, the controller may also deduplicate a message received by two or more of the access points from a client device, wherein the client device sends the message without previously performing a wireless association exchange with those access points. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Therefore, the techniques herein introduce wireless communication approaches that avoid the need of a client device to associate with an access point, so that it can simply transmit to any access point in its range at any given time. In further aspects, the techniques herein also ensure that all the channels can be used in all locations so that a client device can transmit on any channel without failure. The techniques herein also ensure that only one access point is able to transmit to a given location at any given time, so that there is no interference from other access points from the perspective of the client device. In addition, transmissions by a client device can also be received by multiple access points in the mesh, for purposes of redundancy and reliability.

While there have been shown and described illustrative embodiments for semi-distant, time-sliced antennas in an associationless overhead mesh of access points, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed in certain settings, such as a factory or warehouse, the techniques are not limited as such and can be deployed in any number of different settings.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   identifying, by a controller, access points forming an overhead mesh of access points in an area, each access point comprising one or more directional transmitters each configured to transmit a beam cone in a substantially downward direction towards a floor of the area;
   assigning, by the controller, the access points to access point groups;
   generating, by the controller, communication schedules for the access points such that each access point in an access point group is on a common channel and only one of neighboring directional transmitters of access points in that group is able to transmit at any given time; and
   sending, by the controller, the communication schedules to the access points forming the overhead mesh of access points in the area.

2. The method as in claim 1, wherein a directional transmitter of an access point in the overhead mesh comprises a directional antenna.

3. The method as in claim 1, wherein a directional transmitter of an access point in the overhead mesh comprises a Li-Fi emitter.

4. The method as in claim 1, further comprising:
   deduplicating a message received by two or more of the access points from a client device, wherein the client device sends the message without previously performing a wireless association exchange with those access points.

5. The method as in claim 1, wherein the beam cone has a diameter that is greater than a distance between neighboring directional transmitters of one or more access points in any given access point group.

6. The method as in claim 1, wherein the beam cone has a diameter that is less than a distance between directional transmitters belonging to a same access point group that are allowed to transmit simultaneously in accordance with the communication schedules.

7. The method as in claim 1, wherein a transmitter of a client device transmits a message towards the overhead mesh of access points in the area as a beam cone directed substantially upward relative to the client device.

8. The method as in claim 1, wherein a particular access point in the overhead mesh comprises a plurality of directional antennas.

9. The method as in claim 8, wherein the particular access point transmits beam cones substantially downward via its directional antennas in a rotating fashion over time, in accordance with its communication schedule.

10. The method as in claim 8, wherein the particular access point is able to receive messages simultaneously via its directional antennas, in accordance with its communication schedule.

11. An apparatus, comprising:
    one or more network interfaces;
    a processor coupled to the one or more network interfaces and configured to execute one or more processes; and
    a memory configured to store a process that is executable by the processor, the process when executed configured to:
    identify access points forming an overhead mesh of access points in an area, each access point comprising one or more directional transmitters each configured to transmit a beam cone in a substantially downward direction towards a floor of the area;

assign the access points to access point groups;

generate communication schedules for the access points such that each access point in an access point group is on a common channel and only one of neighboring directional transmitters of access points in that group is able to transmit at any given time; and send the communication schedules to the access points forming the overhead mesh of access points in the area.

12. The apparatus as in claim 11, wherein a directional transmitter of an access point in the overhead mesh comprises a directional antenna.

13. The apparatus as in claim 11, wherein a directional transmitter of an access point in the overhead mesh comprises a Li-Fi emitter.

14. The apparatus as in claim 11, wherein the process when executed is further configured to:

deduplicate a message received by two or more of the access points from a client device, wherein the client device sends the message without previously performing a wireless association exchange with those access points.

15. The apparatus as in claim 11, wherein the beam cone has a diameter that is greater than a distance between neighboring directional transmitters of one or more access points in any given access point group.

16. The apparatus as in claim 11, wherein the beam cone has a diameter that is less than a distance between directional transmitters belonging to a same access point group that are allowed to transmit simultaneously in accordance with the communication schedules.

17. The apparatus as in claim 11, wherein a transmitter of a client device transmits a message towards the overhead mesh of access points in the area as a beam cone directed substantially upward relative to the client device.

18. The apparatus as in claim 11, wherein a particular access point in the overhead mesh comprises a plurality of directional transmitters.

19. The apparatus as in claim 18, wherein the particular access point transmits beam cones substantially downward via its directional transmitters in a rotating fashion over time, in accordance with its communication schedule.

20. A tangible, non-transitory, computer-readable medium storing program instructions that cause a controller for an overhead mesh of access points in an area to execute a process comprising:

identifying, by the controller, access points forming the overhead mesh of access points in the area, each access point comprising one or more directional transmitters each configured to transmit a beam cone in a substantially downward direction towards a floor of the area;

assigning, by the controller, the access points to access point groups;

generating, by the controller, communication schedules for the access points such that each access point in an access point group is on a common channel and only one of neighboring directional transmitters of access points in that group is able to transmit at any given time; and sending, by the controller, the communication schedules to the access points forming the overhead mesh of access points in the area.

* * * * *

UNITED STATES PATENT AND TRADEMARK OFFICE
CERTIFICATE OF CORRECTION

PATENT NO. : 12,089,089 B2  
APPLICATION NO. : 17/581188  
DATED : September 10, 2024  
INVENTOR(S) : Pascal Thubert et al.

Page 1 of 1

It is certified that error appears in the above-identified patent and that said Letters Patent is hereby corrected as shown below:

In the Specification

Column 7, Line 49 please amend as shown:  
To prevent energy leakage between cones (e.g., between Signed and Sealed this  
Tenth Day of December, 2024

Katherine Kelly Vidal  
*Director of the United States Patent and Trademark Office*